(12) United States Patent
Miyashita et al.

(10) Patent No.: US 11,982,360 B2
(45) Date of Patent: May 14, 2024

(54) DOUBLE ECCENTRIC BUTTERFLY VALVE AND MANUFACTURING METHOD THEREFOR

(71) Applicant: KITZ CORPORATION, Chiba (JP)

(72) Inventors: Yukihiro Miyashita, Nagano (JP); Chokkaku Yokozawa, Nagano (JP)

(73) Assignee: KITZ CORPORATION, Tokyo (JP)

( * ) Notice: Subject to any disclaimer, the term of this patent is extended or adjusted under 35 U.S.C. 154(b) by 52 days.

(21) Appl. No.: 17/915,003

(22) PCT Filed: Mar. 18, 2021

(86) PCT No.: PCT/JP2021/010967
§ 371 (c)(1),
(2) Date: Sep. 27, 2022

(87) PCT Pub. No.: WO2021/200180
PCT Pub. Date: Oct. 7, 2021

(65) Prior Publication Data
US 2023/0151888 A1 May 18, 2023

(30) Foreign Application Priority Data
Mar. 31, 2020 (JP) .................................. 2020-063931

(51) Int. Cl.
*F16K 1/226* (2006.01)
*F16K 1/22* (2006.01)
(Continued)

(52) U.S. Cl.
CPC ............ *F16K 1/2263* (2013.01); *F16K 1/222* (2013.01); *F16K 1/226* (2013.01); *F16K 1/42* (2013.01); *F16K 1/46* (2013.01); *F16K 27/0218* (2013.01)

(58) Field of Classification Search
CPC ........ F16K 1/2263; F16K 1/222; F16K 1/226; F16K 1/42; F16K 1/46; F16K 27/0218
(Continued)

(56) References Cited

U.S. PATENT DOCUMENTS 4,513,765 A * 4/1985 Rishovd ................ F16K 1/2263
251/173
4,860,994 A * 8/1989 Oshima ................ F16K 1/2261
251/180

(Continued)

FOREIGN PATENT DOCUMENTS

| JP | 2017-180742 | 10/2017 |
|---|---|---|
| JP | 6846872 | 3/2021 |
| WO | 2016/056535 | 4/2016 |

OTHER PUBLICATIONS

International Search Report dated May 18, 2021 in International Application No. PCT/JP2021/010967.

*Primary Examiner* — John Bastianelli
(74) *Attorney, Agent, or Firm* — Wenderoth, Lind & Ponack, L.L.P.

(57) ABSTRACT

An eccentric butterfly valve, suitable for high-pressure fluids, in which: even if a dimensional error among components is large, the seat ring is aligned with the disk while sealability between the seat ring and the body is ensured; for either pressure, positive pressure or counter pressure, the seal surface pressure between the disk and the seat ring is ensured to achieve sealability; and a continuous seal portion is ensured between the body and the seat ring, thereby reliably inhibiting fluid leakage, and a method of manufacturing the eccentric butterfly valve. A tapered surface 31 formed on a seat ring 20 and a step portion 30 formed on a body 2 are opposed to each other. With a corner portion 35 of the step portion 30 on a tapered surface 31 side digging into the tapered surface 31, an annular seal portion 33 is (Continued)

formed on an opposed plane between the body 2 and a seat ring 6.

7 Claims, 4 Drawing Sheets

(51) Int. Cl.
*F16K 1/42* (2006.01)
*F16K 1/46* (2006.01)
*F16K 27/02* (2006.01)

(58) Field of Classification Search
USPC .......................................... 251/298, 305–308
See application file for complete search history.

(56) References Cited

U.S. PATENT DOCUMENTS

| | | | |
|---|---|---|---|
| 6,189,860 B1 * | 2/2001 | Sato | F16K 1/2263 251/305 |
| 6,224,064 B1 * | 5/2001 | St. Germain | F16K 1/2263 277/589 |
| 6,702,257 B1 * | 3/2004 | Mollmann | F16L 55/10 251/305 |
| 2017/0299065 A1 * | 10/2017 | Miyashita | F16K 1/42 |

* cited by examiner (a)

(b)

DOUBLE ECCENTRIC BUTTERFLY VALVE AND MANUFACTURING METHOD THEREFOR

TECHNICAL FIELD

The present invention relates to a double eccentric butterfly valve, in particular, suitable for high-pressure fluids, and a manufacturing method thereof.

BACKGROUND ART

Conventionally, in particular, as valves suitable for high-pressure fluids, eccentric butterfly valves have been generally known. Of these, in particular, in a double eccentric butterfly valve, the rotation axis (valve axis) of the valve disk is eccentric from the center line of the flow path and, furthermore, the rotation axis is eccentric from the sealing surface of the valve disk to a flow path direction, Thus, favorable sealing performance by the seat ring is ensured even at the time of high pressure and, simultaneously, abrasion of the seal surface of the seat ring is prevented.

In the valve of this type, to enhance resistance to high temperatures, the seat ring is often formed of fluororesin. This seat ring is arranged at the above-described double eccentric position, in a state of being interposed between the seat retainer and the body. With this double eccentric structure, in various sizes from a small diameter to a large diameter, it is possible to prevent seal leakage with high accuracy at the time of valve closing in both flow directions, positive pressure and counter pressure. In addition to this, in recent years, it is desired to also inhibit so-called "back leakage". "Back leakage" refers to a phenomenon in which, due to a gap between the body and the seat ring, leakage occurs through the back side of the seat ring.

As a valve taking back leakage measures, the Applicant has suggested the eccentric butterfly valve of PTL 1. In this eccentric butterfly valve, the seat ring has a seat ring main body and a gasket portion integrally provided on the outer circumferential side of this seat ring main body to extend through an edge cutting portion. The edge cutting portion is provided with an engaging portion which prevents back leakage of this gasket portion in a state of engagement between the body and the gasket portion.

The engaging portion is a portion where a tapered step portion surface formed on the gasket portion and a tapered surface formed on the body are engaged. These tapered step portion surface and tapered surface are both formed of tilted surfaces at the same tilt angle. After the seat ring is attached between the body and the seat retainer, the tapered step portion surface and the tapered surface make a surface contact over their entire surfaces to exert a strong seal surface force, allowing prevention of back leakage.

Meanwhile, in the double eccentric butterfly valve, normally, an annular clearance is provided between the outer circumferential side of the seat retainer and the inner circumferential side of the body opposed to this outer circumferential side of the seat retainer. When the valve is assembled, the seat retainer is moved so as to align with the position of the valve disk through the clearance. By aligning the seat ring attached to this seat retainer with the position of the valve disk, even if a dimensional error among components occurs, integral incorporation can be made while a positional discrepancy between sealing surfaces of the valve disk and the seat ring at the time of valve closing is prevented.

CITATION LIST

Patent Literatures

PTL 1: Japanese Patent Application Laid-Open No. 2017-180742

SUMMARY OF INVENTION

Technical Problem

However, in the double eccentric butterfly valve, for example, when the valve disk and the valve stem are assembled to the body, if a dimensional error occurs between the stem hole of each of these valve disk and the body and the center line of the flow path, the valve disk is arranged as being deviated from the body by that dimensional error from a normal position. In this case, when the seat ring is positionally aligned with the valve disk, a deviation occurs also to the seat retainer with respect to the body by this dimensional error.

When a dimensional error among components occurs in this manner, in PTL 1, the tapered step portion surface of the seat ring and the tapered surface of the body are not able to engage in a predetermined surface contact state. In a circumferential direction in which these tapered step portion surface and the tapered surface are superposed each other, a portion where the tapered step portion surface overrides the tapered surface and a portion where a gap occurs between the tapered step portion surface and the tapered surface may occur. In these switching portions, the surface pressure between the tapered step portion surface and the tapered surface is partially interrupted and, when a high-pressure fluid flows or the like, there is a possibility that back leakage occurs from these portions where the surface pressure is interrupted.

Moreover, in the portion where the tapered step portion surface overrides the tapered surface, for example, the seal surface pressure becomes larger than the portion where a gap occurs between these, and this makes it difficult to uniformly form an annular seal portion of the seat ring by the seat retainer and the body. These phenomena occur when, for example, a material resistant to crushing and deformation (such as filler-containing PTFE) is used for the seat ring or the seat is incapable of being sufficiently fastened with the seat retainer. That is, with the seat ring where crushing or deformation easily occurs (such as PTFE not containing a filler), the seat ring can be deformed just right to fill the gap. Also, even if the seat ring is fastened with an excessive force, the gap of the seat ring can be crushed out, and therefore the problem as described above is difficult to occur. However, for example, to seal a fluid with a pressure higher than normal or to seal it in both directions, positive pressure and counter pressure, it is required to use a seat ring with high stiffness, which is unable to be easily deformed, thereby also making it difficult to increase the fastening force.

From these, in PTL 1, to cause the tapered step portion surface and the tapered surface to make a surface contact in a predetermined state, dimensional accuracy at a level where no dimensional error occurs to each component is desired. At the time of assembling, the seat retainer with the seat ring attached thereto and the body are also required to be integrated in a state in which the former is positionally aligned accurately with the latter. Moreover, it is difficult to satisfy both of this high dimensional accuracy and alignment between the seat ring and the valve disk. In actual alignment, the positions of the tapered step portion surface and the tapered surface are shifted, and there is also a possibility that the above-described problems occur.

Thus, it has been desired to develop a double eccentric butterfly valve in which, even if a dimensional error among components such as the valve disk and the valve stem hole in the body is large, the seat ring and the body are positionally aligned to inhibit back leakage and the seat ring and the valve disk are aligned to allow sealability to be ensured.

The present invention was developed to solve the conventional problem, and has an object of providing an eccentric butterfly valve, in particular, suitable for high-pressure fluids, in which: even if a dimensional error among components is large, the seat ring is aligned with the disk while sealability between the seat ring and the body is ensured; for either pressure, positive pressure or counter pressure, the seal surface pressure between the disk and the seat ring is ensured to achieve sealability; and a continuous seal portion is ensured between the body and the seat ring, thereby reliably inhibiting fluid leakage, and a method of manufacturing the eccentric butterfly valve.

Solution to Problem

To achieve the above-described object, an invention according to claim 1 is directed to a double eccentric butterfly valve in which a disk is rotatably and axially supported via a stem inside a cylindrically-shaped body at a position eccentric from each of a center of a flow path and a sealing surface and this disk is provided to be able to seal in a hermetically-sealing state by a seat ring fixed with a seat retainer inside the body and made of an elastic material, wherein a tapered surface formed on the seat ring and a titled surface of a step portion formed on the body are opposed to each other at a tilt angle crossing each other in a radial direction and, at assembling, with a corner portion of the step portion on the tapered surface side digging into the tapered surface, the seat ring is elastically deformed along a shape of the tilted surface and an annular seal portion is formed on an opposed plane between the body and the seat ring.

An invention according to claim 2 is directed to the double eccentric butterfly valve, in which a protruding portion protruding in vicinity of an opposed portion between the tapered surface and the step portion is formed on the seat retainer, and this protruding portion is partially or entirely provided at a position of being superposed on the step portion in the flow path direction.

An invention according to claim 3 is directed to the double eccentric butterfly valve, in which the seat ring is formed of a seat ring main body and a gasket portion integrally provided to extend on an outer circumferential side of this seat ring main body, the tapered surface of the seat ring and the step portion of the body are opposed to each other in vicinity of a boundary portion between the seat ring main body and the gasket portion.

An invention according to claim 4 is directed to the double eccentric butterfly valve, in which in an opposed region between the tapered surface and the step portion, a volume of a region crushed by the step portion digging into the tapered surface and a volume of a space region where the step portion does not dig into the tapered surface have a substantially equivalent size.

An invention according to claim 5 is directed to a manufacturing method of a double eccentric butterfly valve in which a disk is rotatably and axially supported via a stem inside a cylindrically-shaped body at a position eccentric from each of a center of a flow path and a sealing surface and this disk is provided to be able to seal in a hermetically-sealing state by a seat ring fixed with a seat retainer inside the body and made of an elastic material, wherein the disk is caused to be in a closed state and the seat retainer is accommodated in an annular attachment concave portion formed in the body; the seat ring is aligned with a position of the disk in a range of a clearance formed between this attachment concave portion and an outer circumference of the seat retainer; a tapered surface formed on the seat ring and a titled surface of a step portion formed on the body are caused to be opposed to each other at a tilt angle crossing each other in a radial direction; at assembling, with a corner portion of the step portion on the tapered surface side digging into the tapered surface, the seat ring is elastically deformed along a shape of the titled surface; an annular seal portion is formed on an opposed plane between the body and the seat ring; and, in a state in which a seal surface of the seat ring as an end face on an inner circumferential side and a sealing surface of the disk as an outer circumferential surface can be annularly sealed, the seat retainer and the body are fixed together.

An invention according to claim 6 is directed to the manufacturing method of the double eccentric butterfly valve, in which the seat ring is formed of a seat ring main body and a gasket portion integrally provided to extend on an outer circumferential side of this seat ring main body and, in vicinity of a boundary portion between the seat ring main body and the gasket portion, the tapered surface of the seat ring and the step portion of the body are opposed to each other.

An invention according to claim 7 is directed to the manufacturing method of the double eccentric butterfly valve, in which a length of the clearance in a radial direction is shorter than a width of the tapered surface in a radial direction.

Advantageous Effects of Invention

From the invention according to claim 1, because of the double eccentric type, the invention is, in particular, suitable for high-pressure fluids. The annular seal portion is formed of the tapered surface formed on a seat ring side and the step portion formed on a body side. Thus, even if a dimensional error among components is large, with positional alignment within the width of the tapered surface, the corner portion of the step portion reliably digs to ensure sealability between the seat ring and the body. Also, the seat ring is integrated with the disk in a state of being aligned therewith. In either case, positive pressure or counter pressure, the seal surface pressure between the disk and the seat ring at the time of valve closing is ensured to allow sealability to be exerted. A continuous seal portion is ensured by the body and the seat ring in the circumferential direction, thereby allowing leakage from a portion therebetween to be reliably inhibited. The tapered surface of the seat ring and the tilted surface of the body are opposed to each other at the tilt angle crossing each other in the radial direction. Thus, when When the seat ring is combined with the body, the corner portion of the step portion digs into the tapered surface, and the tapered surface and the step portion are caused to reliably abut on each other in a state in which at least a linear contact is made therebetween in the circumferential direction. From this state, the seat ring is elastically deformed along the shape of the tilted surface. Thus, the installation area is gradually increased from the state of maintaining the linear contact to cause a surface contact to integrate the seat ring and the body to form an annular seal portion. Thus, with this seal portion, while the seal surface pressure is improved, a sealing force in the circumferential direction is ensured to be constant, and fluid leakage can be reliably inhibited.

From the invention according to claim 2, by pressurizing the tapered surface by the protruding portion to a step portion side, a reliable locally-pressurized portion can be generated. With an increase in surface pressure force of the seal portion including this locally-pressurized portion, leakage from a portion between the seat ring and the body is reliably inhibited.

From the invention according to claim 3, since the seat ring is provided to have the seat ring main body and the gasket portion, even if the fluid flows in either direction, positive pressure or counter pressure, while the seat ring main body Ilexes at the time of valve closing to ensure sealability with respect to the disk, back leakage can be inhibited by the gasket portion. Here, with the tapered surface and the step portion opposed to each other in the vicinity of the boundary portion between the seat ring main body and the gasket portion, the gasket portion is functionally separated from the seat ring main body, and this gasket portion less tends to receive the influence of deformation of the seat ring main body. Thus, sealability by the gasket portion is enhanced to further improve leakage prevention performance.

From the invention according to claim 4, in the opposed region between the tapered surface and the step portion, the volume of the crushed region of the tapered surface and the volume of the other space region have a substantially equivalent size. Thus, the seat ring can be mounted while the filling ratio by the seat ring pushed from the crushed region to the space region is approximately 100% or more. Thus, excessive filling is prevented, a non-filled region is prevented from being left, and the surface pressure force of the seal portion is substantially uniformly ensured in the circumferential direction to allow an improvement in sealability.

From the invention according to claim 5, even if a dimensional error among components is large, while uniform sealability between the seat ring and the body is ensured by the annular seal portion, the seal surface of the seat ring and the sealing surface of the disk can be caused to be in a state of being annularly sealed. In a state in which sealability between the seat ring and the body and sealability between the seat ring and the disk are both satisfied, the seat retainer and the body can be assembled. After assembling, in either case, positive pressure or counter pressure, sealability between the disk and the seat ring at the time of valve closing is ensured, and fluid leakage from a portion between the body and the seat ring can be reliably inhibited.

In particular, since the tapered surface of the seat ring and the tilted surface of the body are opposed to each other at the tilt angle crossing each other in the radial direction, when the seat ring is accommodated in the body and these are combined, the corner portion of the step portion digs into the tapered surface, and the tapered surface and the step portion are caused to reliably abut on each other in a state in which at least a linear contact is made therebetween in the circumferential direction. From this state, the seat ring is elastically deformed along the shape of the tilted surface. Thus, the installation area is gradually increased from the state of maintaining the linear contact to cause a surface contact to integrate the seat ring and the body to form an annular seal portion. Thus, with this seal portion, while the seal surface pressure is improved, a sealing force in the circumferential direction is continuously ensured, and fluid leakage can be reliably inhibited.

From the invention according to claim 6, even if the fluid flows in either direction, while positive pressure or counter pressure, while the seat ring main body flexes at the time of valve closing to ensure sealability with respect to the disk, back leakage can be inhibited by the gasket portion. Furthermore, with the tapered surface and the step portion opposed to each other in the vicinity of the boundary portion between the seat ring main body and the gasket portion, the gasket portion is functionally separated from the seat ring main body, and this gasket portion less tends to receive the influence of deformation of the seat ring main body. Thus, sealability by the gasket portion is enhanced to further improve leakage prevention performance.

From the invention according to claim 7, when the seat retainer is accommodated in the body, the step portion is not removed from the tapered surface. From a state in which the step portion is reliably opposed to the tapered surface and they are caused to at least make a linear contact therebetween, an annular seal portion is configured, thereby allowing sufficient sealability to be ensured.

DESCRIPTION OF EMBODIMENTS

Figure 1:
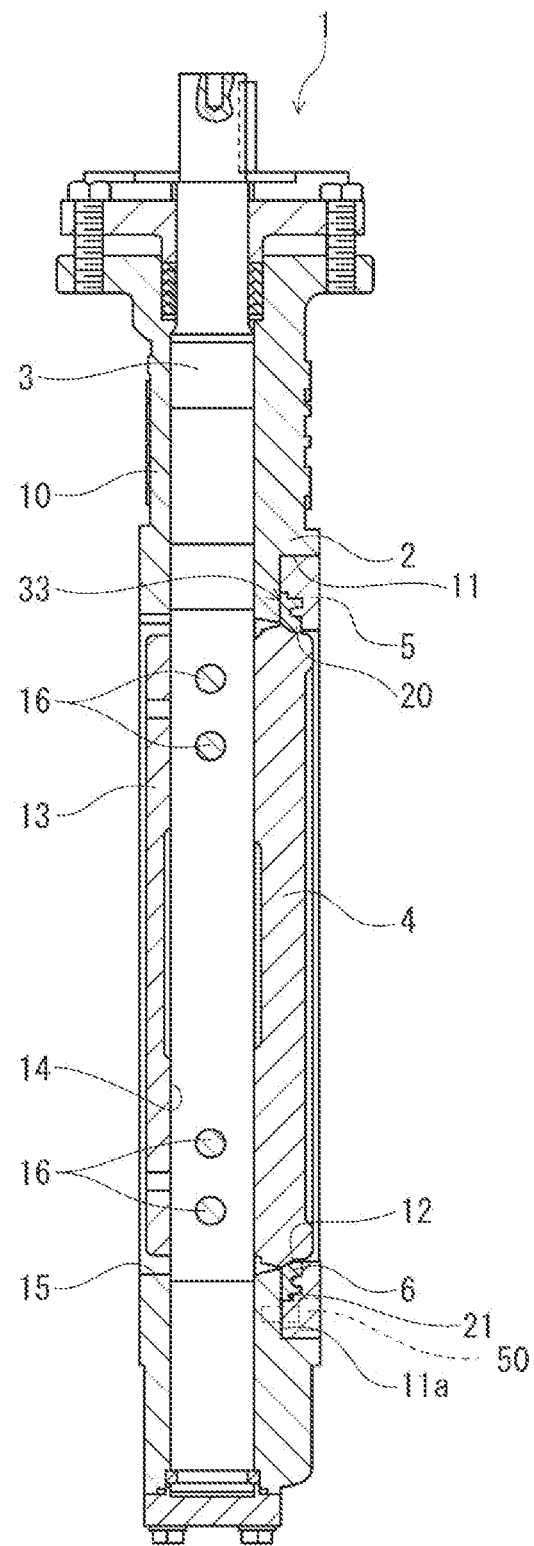
FIG. 1 is a longitudinal sectional view depicting an embodiment of a double eccentric butterfly valve of the present invention.
Figure 2:
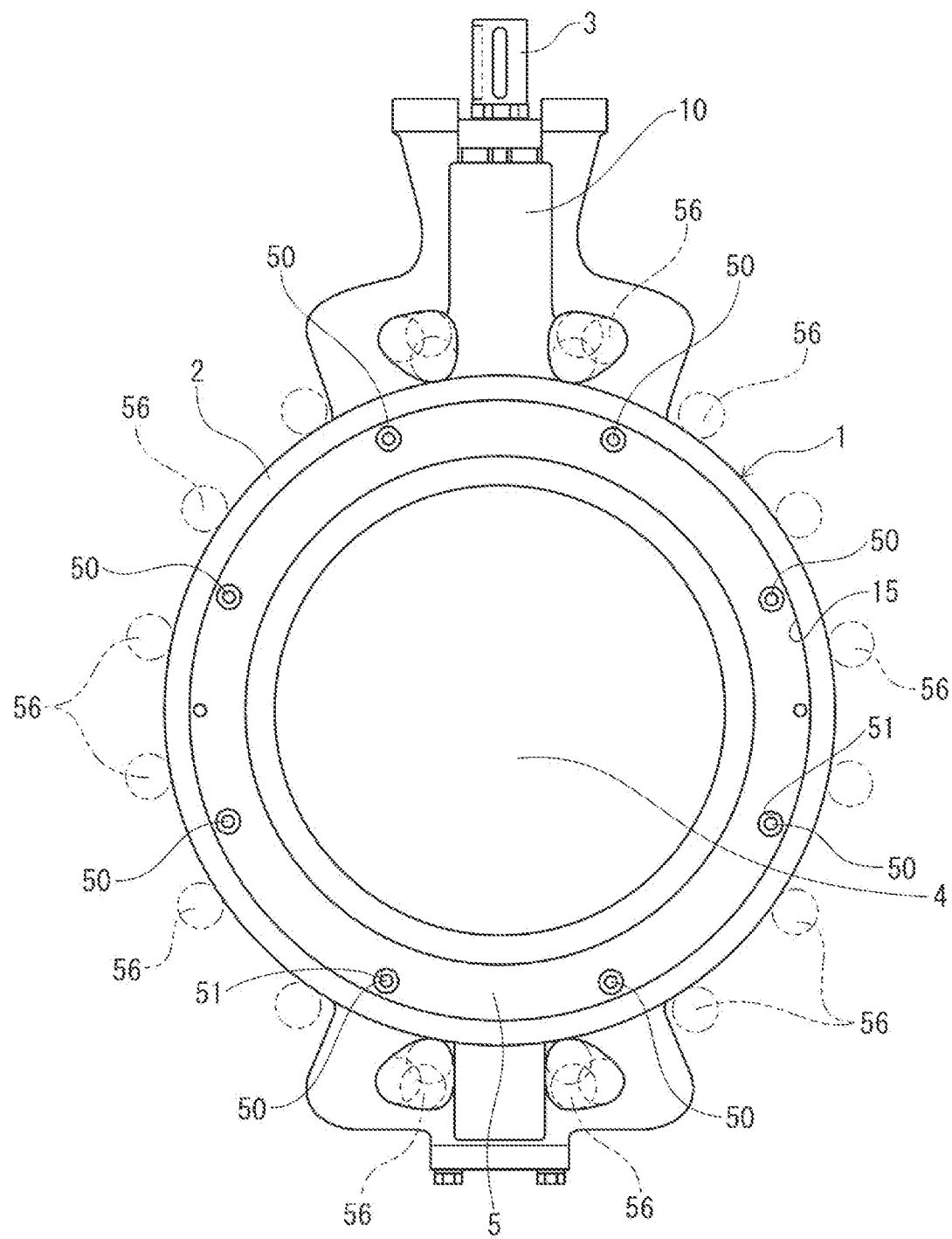
FIG. 2 is a front view of the double eccentric butterfly valve of FIG. 1.
Figure 3:
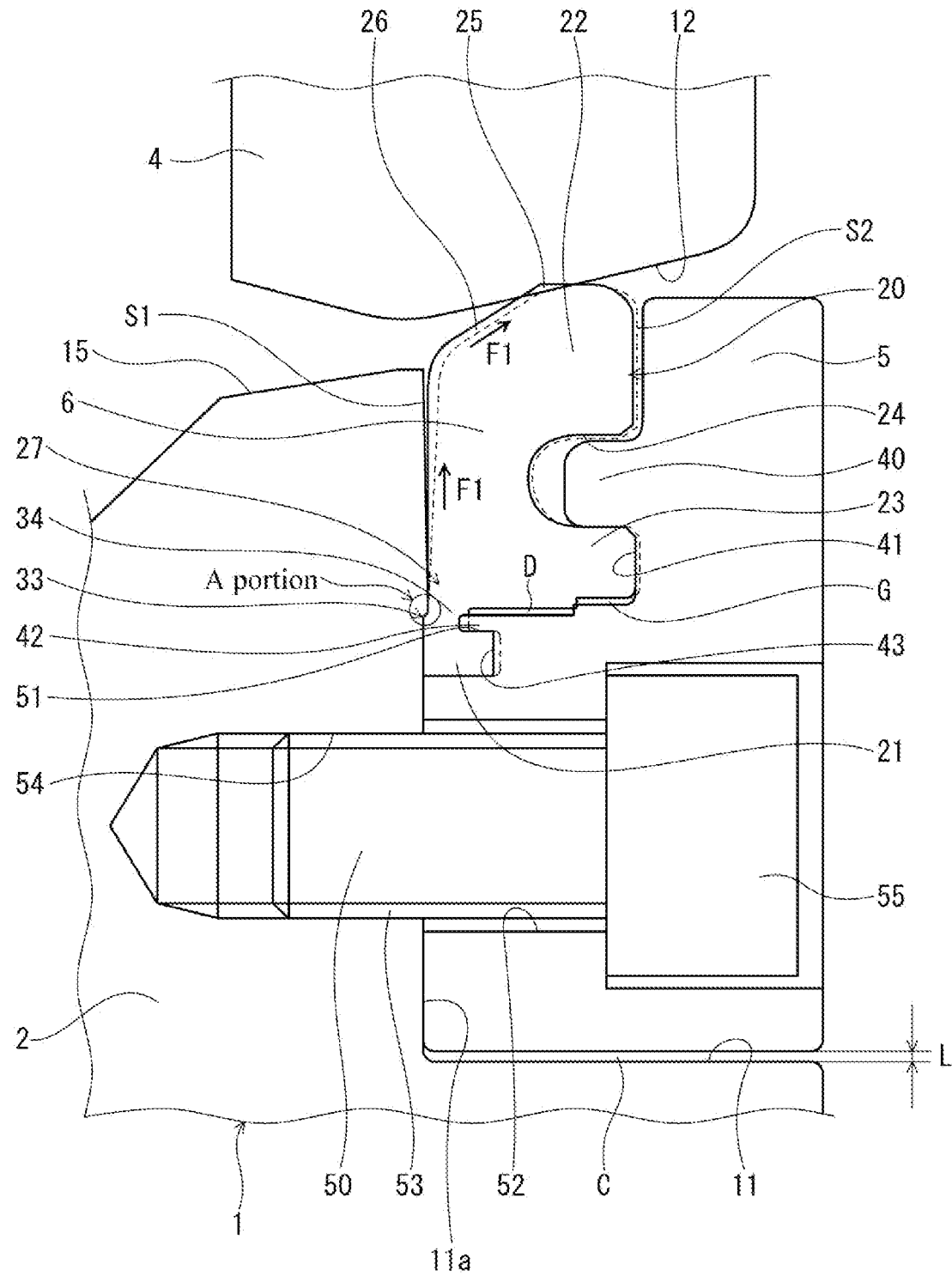
FIG. 3 is an enlarged schematic view of main parts of FIG. 1.

In the following, embodiments of a double eccentric butterfly valve and a manufacturing method thereof in the present invention are described based on the drawings. In FIG. 1 and FIG. 2, an embodiment of the double eccentric butterfly valve of the present invention is depicted. In FIG. 3, an enlarged schematic view of main parts of FIG. 1 is depicted.

A double eccentric butterfly valve (hereinafter referred to as a valve main body 1) depicted in FIG. 1 includes a body 2, a stem 3, a disk 4, a seat retainer 5, and a seat ring 6. Of these, the body 2, the stem 3, the disk 4, and the seat retainer 5 are each molded of a metal material such as stainless steel.

In the valve main body 1, the body 2 is formed in a cylindrical shape. At each of upper and lower portions of this body 2, a shaft-mounting portion 10 for mounting the stem 3 is provided. On one side of the body 2, an annular attachment concave portion 11 is formed. This attachment concave portion 11 is provided to have an inner diameter which can accommodate the seat retainer 5 to which the seat ring 6 is attached. A bottom surface 11a of this attachment concave portion 11 is provided so as to be parallel to a rotation axis of the stem 3.

The disk 4 is formed in a substantially disk shape. On an outer circumferential surface of this disk 4, a sealing surface 12 is provided. Also, on one surface side, a boss portion 13 is formed so as to be provided as protruding. In this boss portion 13, a hole portion 14 for mounting the stem 3 is formed at a position that is eccentric from the sealing surface 12 as a seal position. Inside the valve main body 1 of FIG. 1, a flow path 15 is provided. In the case of a flow in a position direction, the right side of the valve main body 1 serves as a primary side of the flow path 15, and the left side thereof serves as a secondary side, and a fluid flows from the right side to the left side inside the valve main body 1.

The disk 4 is integrally fixed to the stem 3 with tapered pins 16, and is rotatably and axially supported via the stem 3 at a position eccentric from each of the center of the flow path 15 and the sealing surface 12. With the disk 4 attached in a double eccentric structure in this manner, the disk 4 is provided so as to be able to seal at the time of valve closing in a hermetically-sealing state by the seat ring 6 fixed with the seat retainer 5 inside the body 2.

In FIG. 2 and FIG. 3 the seat ring 6 is annularly molded of an elastic material and, in the present embodiment, for example, is formed of a resin material such as PTFE (polytetrafluoroethylene) containing a filler such as carbon. This seat ring 6 has a seat ring main body 20 and a gasket portion 21 integrally provided to extend on an outer circumferential side of this seat ring main body 20.

The seat ring main body 20 is provided so as to have a portion in the vicinity of the outer diameter fixed between the body 2 and the seat retainer 5 and, on the other hand, have a portion in the vicinity of the inner circumference capable of flexing. An end face on its inner circumferential side (inner circumferential tip side) is provided to serve as a seal surface and abut on the sealing surface 12 of the disk 4 at the time of valve closing to be capable of annular sealing.

In the seat ring main body 20, a flexible portion 22 is provided on its inner diameter side, and a fixing portion 23 is provided on an outer diameter side with respect to this flexible portion 22. Between these flexible portion 22 and the fixing portion 23, a space portion 24 is provided. The flexible portion 22 has a seal surface 25 and a tilted surface 26. The seal surface 25 is annularly provided on an inner diameter end portion side of the flexible portion 22, having a cross section in a C-surface shape or a cross section in an It-surface shape and a predetermined seal width. Continuously to this seal contact portion 25, the tilted surface 26 is provided in a mildly tilted shape.

Figure 4:
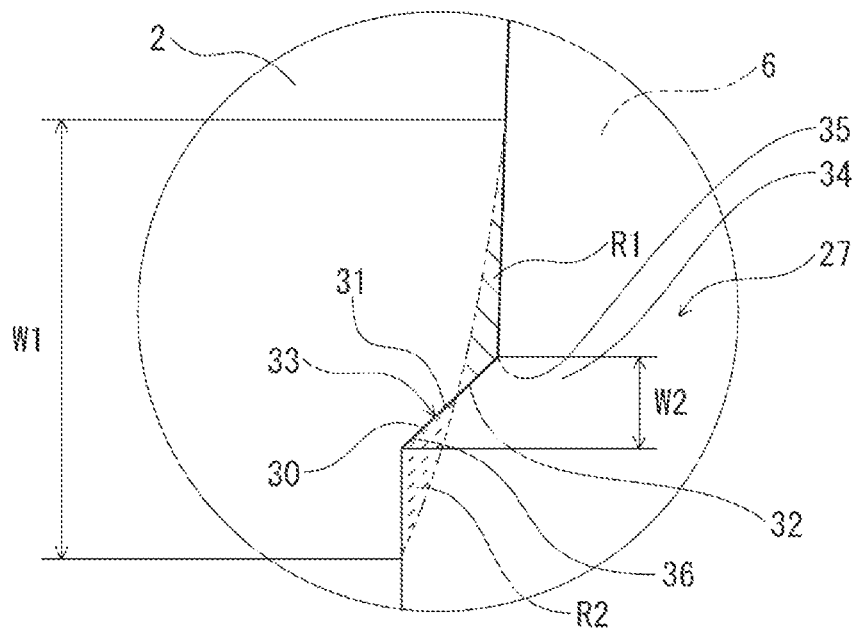
FIG. 4 is an enlarged schematic view of an A portion of FIG. 3.
Figure 4:
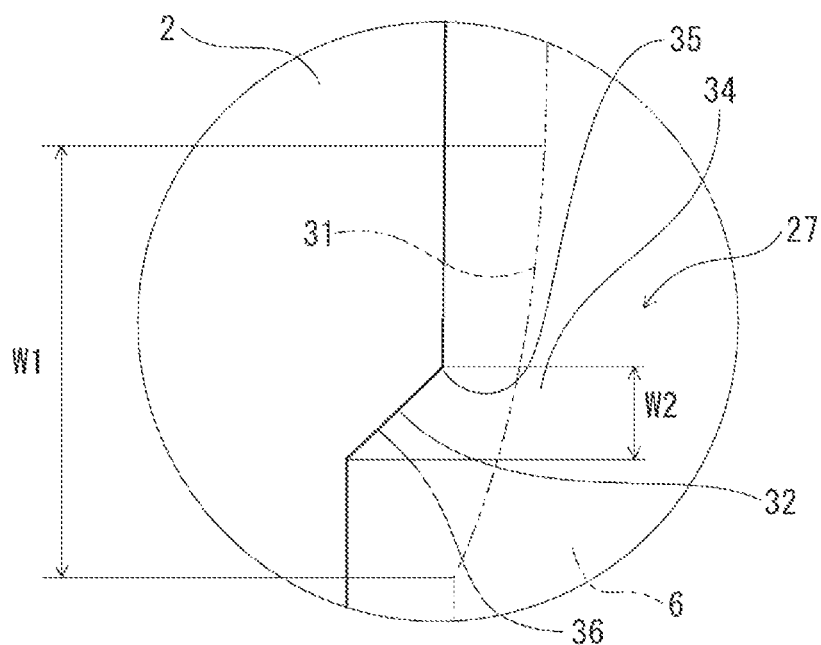

FIG. 4(*a*) is an enlarged schematic view of an A portion of FIG. 3, and FIG. 4(*b*) represents a state of the body 2 and the seat ring 6 before attachment. In the vicinity of a boundary portion 27 between the seat ring main body 20 and the gasket portion 21, a step surface 30 forming a step in a diameter direction is formed between the body 2 and the seat ring 6 as an opposed plane in a circumferential direction. On the step surface 30, a tapered surface 31 formed on a seat ring 6 side and a step portion 32 formed on a body 2 side are opposed to each other.

Of these, the tapered surface 31 is provided so as to have a size of a width W1 in a radial direction by a mild R surface connecting the seat ring main body 20 and the gasket portion 21 in a sectional direction, and is tilted so as to go toward a body 2 side from an inner diameter side to an outer diameter side.

The step portion 32 is provided at a position opposed to the tapered surface 31 so as to have a surface (tilted surface 36) tilted at an angle on the order of substantially 45 degrees in cross section from a bottom surface 11*a* of the attachment concave portion 11. The step portion 32 has a section in an uneven shape in which an inner diameter side protrudes to a seat ring 6 side with this tilted surface 36 taken as a boundary. The step portion 32 has a corner portion 35 protruding to a seat ring 6 side and positioned. inside the width W1 of the tapered surface 31 in the radial direction. The tilted surface 36 of this step portion 32 has a width W2 which allows arrangement inside the width W1 of the tapered surface 31 in the radial direction, and is formed so that the tilt in the radial direction is steeper than the tapered surface 31. In this manner, the tilted surface 36 of the step portion 32 and the tapered surface 31 are opposed so as to cross each other. Also, since the height (width in a flow path direction) of the step portion 32 of the body 2 and the height of a step interposing the tapered surface 31 of the seat ring 6 are substantially equal. Thus, opposed surfaces of the seat ring 6 and the body 2 can just abut on each other except for the step surface 30.

From the shape described above, when the seat ring 6 is pressed onto the body 2, the corner portion 35 of the step portion 32 on a tapered surface 31 side digs into the tapered surface 31, and the tapered surface 31 side goes along the shape of the step portion 32 to cause the seat ring 6 to be elastically deformed. With the tapered surface 31 and the corner portion 35, an annular seal portion 33 is formed on the step surface 30. This seal portion 33 allows the seat ring 6 and the body 2 to be uniformly sealed.

In FIG. 4(*a*), before deformation of the seat ring 6, a region RI (a region indicated by solid-line hatching) crushed 1*w* the step portion 32 on the tapered surface 31 and a space region R2 (a region indicated by broken-line hatching) where the step portion 32 in which the seat ring 6 in this region R1 is pushed out and accommodated does not dig into the tapered surface 31 are provided so as to have a substantially equal size. By deformation of the seat ring 6, the region R1 crushed by the step portion 32 is provided so as to be deformable inside the space region R2.

With this, in an opposed region between the tapered surface 31 and the step portion 32, the volume of the region R1 crushed by the step portion 32 digging into the tapered surface 31 and the volume of the space region R2 where the step portion 32 does not dig into the tapered surface 31 have a substantially equivalent size, approximately 100% of a portion of the seat ring 6 having the amount of the former region R1 is pushed out by the space region R2 and the filling ratio in the vicinity of this step surface 30 is approximately 100%. And, with pressurization by a protruding portion 42 described below, this filling ratio becomes equal to or more than 100%, and the seal surface pressure of the seal portion 33 is highly maintained. If this filling ratio is smaller than 100%, the seal surface pressure of the seal part 33 extremely decreases. On the other hand, if the filling ratio is too high, the fastening force becomes excessive. Thus, it is desired to configure the tapered surface 31 and the step portion 32 so that the above-described region R1 and space region R2 are approximately equal so that the filling ratio reliably exceeds 100% and is not excessive too much.

The fixing portion 23 is tightly interposed between the body 2 and the seat retainer 5 in a state in which the flexible portion 22 flexes and, in this state, the seat ring main body 20 is fixed. The space portion 24 is formed so as to be cut out in a groove shape along a circumferential direction. Via this space portion 24, the flexible portion 22 flexes to a positive pressure direction or counter pressure direction by a surface pressure from the disk 4 and a fluid pressure, and the seal surface 25 is provided so as to be able to abut on and seal the sealing surface 12 of the disk 4.

A solid line indicating the seat ring main body 20 in FIG. 3 indicates a shape when the seal surface 25 receives a positive pressure at the time of valve closing to abut on the disk 4, and a broken line indicates a shape when the disk 4 receives a counter pressure at the time of valve dosing to be deformed. A one-dot-chain line indicates a shape of a section of the seat ring main body 20 before attachment to the seat retainer 5.

The gasket portion 21 is integrally provided by a thin-walled portion 34 to extend on the outer circumferential side of the fixing portion 23. This thin-walled portion 34 is formed to have a thickness which can inhibit an outflow of a superfluous portion by thermal expansion, and has a sufficient thickness ensured together with the gasket portion 21.

The seat retainer 5 is substantially annularly provided, and has formed on a side TO opposed to the body 2 a protrusively-provided portion 40, a concave-shaped groove 41, the protruding portion 42, and an attachment concave groove 43. The protrusively-provided portion 40 is formed at a position opposed to the space portion 24 of the seat ring main body 20, and has a length shorter than the depth of the space portion 24 in a perpendicular direction with respect to the stem 3.

The concave-shaped groove 41 is formed on an outer diameter side of the protrusively-provided portion 40, and has a width approximately equal to or slightly longer than the length of the fixing portion 23 in the perpendicular direction with respect to the stem 3 and longer than the fixing portion 23 in the radial direction. With this, before fastening of the seat retainer 5, a gap portion G is provided between the outer circumferential surface of the fixing portion 23 and the inner circumferential surface of the seat retainer 5. The capacity of the gap portion G is set so as to be larger than the volume of the fixing portion 23 even with fastening with retainer bolts 50 for fixedly attaching the seat retainer 5 and if the fixing portion 23 is crushed to be deformed to an outer diameter side. With this structure, after fastening of the seat retainer 5, the fixing portion 23 is fixed inside the concave-shaped groove 41.

Also, the fixing portion 23 is configured so as to hardly crush the concave-shaped groove 41, thereby easily causing pressing and crushing by the protruding portion 42 of the thin-walled portion 34 and pressing and crushing by the attachment concave groove 43 of the gasket portion 21.

The protruding portion 42 is formed to protrude with a width narrower than the concave-shaped groove 41 to an outer diameter side in the perpendicular direction with respect to the stem 3 in the vicinity of the boundary portion 27 between the seat ring main body 20 and the gasket portion 21, and is provided at a position where this protruding portion 42 is partially or entirely superposed on the step portion 32 in a flow path direction, that is, an opposed portion between the tapered surface 31 and the step portion 32. In this case, a gap D is provided to have a width shorter than the protruding portion of the gasket portion 21 and thinner than the thin-walled portion 34 in a radial direction and is provided between an outer circumferential side of the fixing portion 23 and an inner circumferential side of the protruding portion 42.

The protruding portion 42 is inserted from an insertion space 51 having a narrow width provided between the fixing portion 23 of the seat ring main body 20 and the gasket portion 21, and the thin-walled portion 34 is pressurized by a tip of the protruding portion 42 to a body 2 side with a high surface pressure. When thermal expansion occurs in the flexible portion 22 and the fixing portion 23 by a heat cycle, a superfluous portion by thermal expansion is absorbed by the gap D and does not influence the seal surface 25 and the gasket portion 21.

The attachment concave groove 43 is formed on the outer circumferential side of the protruding portion 42 to be longer than a tip side of the gasket portion 21 in the perpendicular direction with respect to the stem 3 and have a long width in the radial direction. With this structure, between the gasket portion 21 and the seat retainer 5, a gap portion is formed in each of the radial direction and the perpendicular direction with respect to the stem 3. Via these gap portions, the gasket portion 21 is attached in a filling state.

The seat retainer 5 is provided so as to have an outer diameter slightly smaller than the attachment concave portion 11, and an annular clearance C is formed between these attachment concave portion 11 and the outer circumference of the seat retainer 5. In the range of this clearance C, the seat retainer 5 can move with respect to the body 2, In this range, the seat ring 6 can be aligned with the position of the disk 4. With this, in a state in which the seal surface 25 of the seat ring 6 and the sealing surface 12 of the disk 4 are annularly sealed, the seat retainer 5 and the body 2 can be assembled.

The seat retainer 5 is formed so as to have an outer diameter so that a length L of the clearance C in the radial direction is shorter than the width W1 of the tapered surface 31 in the radial direction. From this, when the seat retainer 5 is accommodated in the attachment concave portion 11, even if the seat retainer 5 is put to one side at the maximum inside this attachment concave portion 11, the seat retainer 5 and the body 2 can be fixed while the state is maintained in which the tapered surface 31 is superposed on the step portion 32 (in particular, in the vicinity of the corner portion).

As depicted in FIG. 2 and FIG. 3, in the seat retainer 5, stepped fastening holes 52 are equidistantly formed at eight locations. On a body 2 side corresponding these fastening holes 52, female screws 54 where male screws 53 of the retainer bolts 50 are screwable are provided. The body 2 and the seat retainer 5 are provided so as to be able to be fastened, in a state in which the seat ring main body 20 is attached therebetween, with the retainer bolts 50. With their fastening forces, the gasket portion 21 is interposed between the body 2 and the seat retainer 5.

In this case, the positions of the fastening holes 52 and the female screws 54 are set so that the gasket portion 21 is arranged at positions where head portions 55 of the retainer bolts 50 are opposed. Thus, the force of interposing the gasket portion 21 effectively occurs.

After fastening of the retainer bolts 50, the valve main body 1 is interposed by a piping flange not depicted. With the outer circumferential side jointed with piping bolts 56 depicted in FIG. 2, the seat ring main body 20 becomes in a state of being more firmly mounted.

After attachment of the seat retainer 5, as depicted in FIG. 3, a space S1 is provided between the body 2 and the flexible portion 22 and a space S2 is provided between the seat retainer 5 and the flexible portion 22. With these spaces S1 and S2, the flexible portion 22 is flexibly deformed in a direction of the seat retainer 5 and/or the body 2.

Note that while the tapered surface 31 is formed to have a mild R surface in the above-described embodiment, this tapered surface may be formed of a linear tilted surface or a mild convex curved surface. On the other hand, the tilted surface 36 of the step portion 32 is formed at an angle of substantially 45 degrees. Although this angle may be other than 45 degrees, the tilted surface 36 is desired to be steeper than at least the tapered surface 31. This facilitate digging of the corner portion 35 of the step portion 32 into the tapered surface 31.

Also, a tapered surface may be formed on a body 2 side, and a step portion may be formed on a seat ring 6 side. Furthermore, in either case, with the step portion as a boundary, an uneven shape with its outer diameter side deformed to a primary side and its inner diameter side deformed to a secondary side may be provided in the vicinity of the boundary portion.

Next, a manufacturing method of the above-described double eccentric butterfly valve and its action are described.

First, the stem 3 is inserted through the shaft-mounting portion 10 of the body 2 and the hole portion 14 of the disk 4, the disk 4 is fixed to the stem 3 with the tapered pins 16, and the disk 4 is mounted to the body 2 so as to be in a state of being rotatable by the stem 3.

From this state, the stem 3 is operated to rotate to a closing direction to cause the disk 4 to be in a closed state. Then, the seat retainer 5 with the seat ring 6 attached thereon is accommodated in the attachment concave portion 11 of the body 2. Here, between the outer circumference of the seat ring 6 and the inner circumference of the attachment concave portion 11, the annular clearance C is formed. The seat ring 6 can move in the radial direction by this clearance C inside the attachment concave portion 11.

Subsequently, the retainer bolts 50 are inserted into the fastening holes 52 for fastening. With these retainer bolts 50, the seat retainer 5 and the body 2 are fixed together. Also, between these retainer bolts 50 and the fastening holes 52 (including the head portions 55 and the surroundings), a clearance is provided, allowing alignment described below.

Here, with fastening of the retainer bolts 50, the seal surface 25 is guided along the tilt of the sealing surface 12. With this guide, the seat ring 6 (seat retainer 5) moves the attachment concave portion 11 in the radial direction in the range of the clearance C, and a contact between the seal surface 25 and the sealing surface 12 is appropriately adjusted to become in a state of allowing annual abutting and sealing. In this manner, with fastening of the retainer bolts 50, an alignment action of aligning the seat ring 6 with the position of the disk 4 is exerted on the seat retainer 5.

In this case, the tapered surface 31 and the step portion 32 are opposed to each other, the tapered surface 31 abuts on the step portion 32, and the tapered surface 31 is guided so as to slide in the vicinity of the corner portion of the step portion 32. Thus, the seat ring 6 is smoothly aligned. Simultaneously, with fastening of the retainer bolts 50, the corner portion 35 of the step portion 32 digs into the tapered surface 31, and the tapered surface 31 is elastically deformed along the step portion 32.

At that time, while the state of the tapered surface 31 abutting on the corner portion of the step portion 32 is maintained, the tapered surface 31 is gradually deformed along the uneven shape of the step portion 32. Thus, in a state in which while a linear contact between the corner portion 35 of the step portion 32 and the tapered surface 31 causes the annual seal portion 33 to be formed on an opposed plane between the body 2 and the seat ring 6, the seal surface 25 and the sealing surface 12 can be annularly sealed, the seat retainer 5 and the body 2 are fixed together. Thus, while the contact area TO gradually increases from a state in which at least a linear contact is maintained, a surface contact is made to allow the seal portion 33 to be configured.

In the valve main body 1 in the above-described embodiment of the present invention, the tapered surface 31 is formed to have the width W1 by a mild R surface; while the step portion 32 is formed so as to have the tilted surface 36 at an angle of substantially 45 degrees from the bottom surface 11a of the attachment concave portion, its width W2 is provided so as to have a size allowing arrangement inside the width W1 of the tapered surface 31; and the tilt of the step portion 32 in the radial direction is provided so as to be steeper than the tapered surface 31. With this, as described above, at the time of assembling, in a state of a contact by the annular seal portion 33 occurring from the tapered surface 31 and the corner portion 35 of the step portion 32, the seat retainer 5 moves in the range of the clearance C to allow the seat ring 6 to be aligned with the disk 4. Thus, in a state in which sealability of the seal portion 33 in the circumferential direction is uniformly ensured, a seal surface pressure between the disk 4 and the seat ring 6 can be improved.

In this case, since the length L of the clearance C in the radial direction is shorter than the width W1 of the tapered surface 31 in the radial direction, when the seat retainer 5 is accommodated in the attachment concave portion 11, even if this seat retainer 5 moves at the maximum inside the clearance C, the state in which the tapered surface 31 is partially superposed on the step portion 32 in the flow path 15 direction can be maintained. Thus, from the state in which at least a linear contact is made between the tapered surface 31 and the corner portion 35 of the step portion 32, the annular seal portion 33 can be reliably formed. If the width W1 is four to six times as long as the length L of the clearance, the annular seal portion 33 can be reliably formed, allowing also a further higher seal surface pressure to be obtained.

After assembling, it is possible to support a case in which a fluid pressure is applied to the disk 4 at the time of valve closing to either direction, positive pressure or counter pressure.

When a positive pressure is applied to the disk 4, while the flexible portion 22 is tilted to left by the fluid pressure, the state of abutting on the disk 4 is ensured to maintain the seal state. Even when a further high pressure is applied from this state, the flexible portion 22 is elastically deformed to a disk 4 side to fall down, thereby causing the seal surface 25 to strongly make pressure contact with the disk 4. Moreover, since so-called a self-seal function is exerted, in which the fluid enters the space portion from the space S2 to pressurize to a downstream side, the seal surface pressure at the seal portion increases so as to be proportional to an increase in pressure.

On the other hand, when a counter pressure is applied to the disk 4, the flexible portion 22 is tilted to right by the fluid pressure, thereby improving the seal surface pressure while the state of abutting on the disk 4 is ensured. When a further high pressure is applied from this state, the flexible portion 22 abuts on the seat retainer 5 to prevent an increase in internal stress of the seat ring main body 20 and maintain elasticity of the material, and sealability can be ensured.

In either case, positive pressure and counter pressure, the sealing surface 12 and the seal surface 25 are arranged in an aligned state. Thus, a uniform seal surface pressure is exerted between the disk 4 and the seat ring 6 in the circumferential direction, and leakage from a portion between these disk 4 and seat ring 6 is reliably prevented.

In this case, in particular, at the time of counter pressure, a force F in a direction indicated by an arrow in FIG. 3 is exerted on the flexible portion 22. This force F increases more since the movement of the disk 4 increases as the diameter of the valve main body 1 is larger, such as 250A or 300A. When the force F increase, with that increase, a tensile force F1 to the inner diameter direction with the tilt of the flexible portion 22 also increases, and a profound pulling force is applied in the vicinity of the gasket portion 21.

By contrast, since the seal portion 33 including the tapered surface 31 and the step portion 32 is provided in the vicinity of the step surface 30, a seal force in the circumferential direction is exerted by this seal portion 33 to reliably inhibit back leakage and also inhibit the influence of the tilt of the seat ring main body 20 due to the flow of the fluid over the gasket portion 21.

Since the region R1 crushed by the step portion 32 and the space region R2 as a space with respect to the step portion 32, the space where this region R1 is accommodated, have a substantially equivalent size, when the tapered surface 31 is deformed, while the region R1 crushed by the step portion 32 is deformed so as to escape to the space region R2, the seal portion 33 is provided in the vicinity of the step surface 30. With this seal portion 33, sealing is made while the surface pressure between the tapered surface 31 and the step portion 32 is continuously and substantially uniformly exerted without interruption in the circumferential direction. Thus, application of excessive pressure from the step portion 32 onto part of the tapered surface 31 and an occurrence of a gap between the tapered surface 31 and the step portion 32 can be prevented, and excellent sealability can be exerted by the seal portion 33.

On the seat retainer 5, the protruding portion 42 protruding in the vicinity of the boundary portion 27 is formed, and this protruding portion 42 is partially or entirely provided at a position of being superposed on the step portion 32 in the flow path 15 direction. Thus, when the seat retainer 5 is fixed to the body 2, the tapered surface 31 is pressurized onto the step portion 32 by the protruding portion 42 via the thin-walled portion 34 and these are strongly pressed to deform the tapered surface 31 along the shape of the step portion 32, and the seal portion 33 exerting a uniform surface pressure can be configured.

The body 2 and the seat retainer 5 are fastened with the retainer bolts 50, and the gasket portion 21 is interposed by the fastening force of these retainer bolts 50. Thus, in particular, in the case of a large diameter, the fastening force to the gasket portion 21, which tends to run short, is increased by the piping bolts 56 to enhance the sealing force by this gasket portion 21, and a back-leakage preventing function can be thereby improved.

in the foregoing, while the embodiments of the present invention have been described in detail, the present invention is not limited to the embodiments described above and can be variously changed in a scope not deviating from the spirit of the invention described in the claims of the present invention.

REFERENCE SIGNS LIST 1 valve main body
2 body
3 stem
4 disk
5 seat retainer
6 seat ring
12 sealing surface
15 flow path
20 seat ring main body
21 gasket portion
25 seal surface
31 tapered surface
32 step portion
33 seal portion
35 corner portion
42 protruding portion
43 attachment concave portion
C clearance
L length of clearance in a radial direction
R1 crushed region
R2 space region
W1 width of the tapered surface in a radial direction
W2 width

The invention claimed is:

1. A manufacturing method of a double eccentric butterfly valve in which a disk is rotatably and axially supported via a stem inside a cylindrically-shaped body at a position eccentric from each of a center of a flow path and a sealing surface and this disk is provided to be able to seal in a hermetically-sealing state by a seat ring fixed with a seat retainer inside the body and made of an elastic material, wherein the disk is caused to be in a closed state and the seat retainer is accommodated in an annular attachment concave portion formed in the body; the seat ring is aligned with a position of the disk in a range of a clearance formed between this attachment concave portion and an outer circumference of the seat retainer; a tapered surface formed on the seat ring and a tilted surface of a step portion formed on the body are caused to be opposed to each other at a tilt angle crossing each other in a radial direction; at assembling, with a corner portion of the step portion on the tapered surface side digging into the tapered surface, the seat ring is elastically deformed along a shape of the tilted surface; an annular seal portion is formed on an opposed plane between the body and the seat ring; and, in a state in which a seal surface of the seat ring as an end face on an inner circumferential side and a sealing surface of the disk as an outer circumferential surface can be annularly sealed, the seat retainer and the body are fixed together.

2. The manufacturing method of the double eccentric butterfly valve according to claim 1, wherein the seat ring is formed of a seat ring main body and a gasket portion integrally provided to extend on an outer circumferential side of this seat ring main body and, in vicinity of a boundary portion between the seat ring main body and the gasket portion, the tapered surface of the seat ring and the step portion of the body are opposed to each other.

3. The method of manufacturing the double eccentric butterfly valve according to claim 1, wherein a length of the clearance in a radial direction is shorter than a width of the tapered surface in a radial direction.

4. A double eccentric butterfly valve in which a disk is rotatably and axially supported via a stem inside a cylindrically-shaped body at a position eccentric from each of a center of a flow path and a sealing surface and this disk is provided to be able to seal in a hermetically-sealing state by a seat ring fixed with a seat retainer inside the body and made of an elastic material, wherein a tapered surface formed on the seat ring and a tilted surface of a step portion formed on the body are opposed to each other at a tilt angle crossing each other in a radial direction and, at assembling, with a corner portion of the step portion on the tapered surface side digging into the tapered surface, the seat ring is elastically deformed along a shape of the tilted surface and an annular seal portion is formed on an opposed plane between the body and the seat ring.

5. The double eccentric butterfly valve according to claim 4, wherein a protruding portion protruding in vicinity of an opposed portion between the tapered surface and the step portion is formed on the seat retainer, and this protruding portion is partially or entirely provided at a position of being superposed on the step portion in the flow path direction.

6. The double eccentric butterfly valve according to claim 4, wherein the seat ring is formed of a seat ring main body and a gasket portion integrally provided to extend on an outer circumferential side of this seat ring main body, the tapered surface of the seat ring and the step portion of the body are opposed to each other in vicinity of a boundary portion between the seat ring main body and the gasket portion.

7. The double eccentric butterfly valve according to claim 4, wherein, in an opposed region between the tapered surface and the step portion, a volume of a region crushed by the step portion digging into the tapered surface and a volume of a space region where the step portion does not dig into the tapered surface have a substantially equivalent size.

* * * * *